United States Patent
Diana et al.

(10) Patent No.: US 7,036,777 B2
(45) Date of Patent: May 2, 2006

(54) ZERO BACKLASH POSITIONING DEVICE

(75) Inventors: Carl C. Diana, Round Lake, IL (US); John A. Bostic, Plainfield, IL (US); Daniel A. Cloud, Glenview, IL (US); Rodney S. Harris, Oak Park, IL (US)

(73) Assignee: Quickset International, Inc., Northbrook, IL (US)

( * ) Notice: Subject to any disclaimer, the term of this patent is extended or adjusted under 35 U.S.C. 154(b) by 383 days.

(21) Appl. No.: 10/437,634

(22) Filed: May 14, 2003

(65) Prior Publication Data
US 2004/0226395 A1   Nov. 18, 2004

(51) Int. Cl.
*F16M 11/14*   (2006.01)
*F16H 55/18*   (2006.01)
*G03B 17/00*   (2006.01)

(52) U.S. Cl. .............. 248/183.4; 248/183.2; 348/373; 74/409; 396/428; 352/243

(58) Field of Classification Search .......... 248/183.4, 248/185.1, 278.1, 183.2; 348/373; 74/665 C, 74/425, 89.14, 409; 396/428, 419; 352/243
See application file for complete search history.

(56) References Cited

U.S. PATENT DOCUMENTS

| | | | | |
|---|---|---|---|---|
| 2,533,043 A | * | 12/1950 | Price ............................ | 74/409 |
| 2,555,638 A | * | 6/1951 | Fishter ...................... | 248/183.4 |
| 2,655,050 A | * | 10/1953 | Gille et al. .................. | 74/409 |
| 3,164,838 A | * | 1/1965 | Heinrich ....................... | 352/69 |
| 3,437,753 A | * | 4/1969 | Stith ...................... | 348/211.11 |
| 3,469,469 A | * | 9/1969 | Burger .......................... | 74/409 |
| 4,655,567 A | * | 4/1987 | Morley ....................... | 352/243 |
| 4,673,268 A | * | 6/1987 | Wheeler et al. ............ | 352/243 |
| 4,838,117 A | * | 6/1989 | Bittner ..................... | 74/665 C |
| 4,890,713 A | * | 1/1990 | Pagano ................... | 192/142 R |
| 4,937,675 A | * | 6/1990 | Starceski et al. ........... | 348/373 |
| 5,058,842 A | * | 10/1991 | Zemlin et al. ........... | 248/185.1 |
| 5,463,432 A | * | 10/1995 | Kahn .......................... | 352/243 |
| 5,802,412 A | * | 9/1998 | Kahn .......................... | 396/427 |
| 5,850,579 A | * | 12/1998 | Melby et al. ............. | 396/427 |
| 6,027,257 A | * | 2/2000 | Richards et al. ............ | 396/428 |
| 6,356,308 B1 | * | 3/2002 | Hovanky .................... | 348/373 |
| 6,503,000 B1 | * | 1/2003 | Kim ........................... | 396/427 |
| 6,880,987 B1 | * | 4/2005 | Diana et al. ................ | 396/427 |
| 2002/0044214 A1 | * | 4/2002 | Hovanky .................... | 348/373 |
| 2003/0077082 A1 | * | 4/2003 | Ito .............................. | 396/428 |
| 2004/0184798 A1 | * | 9/2004 | Dumm ....................... | 396/428 |

FOREIGN PATENT DOCUMENTS

JP   08248483 A   *   9/1996
JP   09018748 A   *   1/1997

* cited by examiner

*Primary Examiner*—Anita M. King
(74) *Attorney, Agent, or Firm*—Pauley Petersen & Erickson

(57) ABSTRACT

A positioning device without backlash includes a table and at least one gear operatively associated with the table. At least one worm gear is connected to the gear and the gear is driven in a desired direction with a primary motor and a synchronized slave motor. The synchronized slave motor is then reversible to remove the backlash in the positioning device thereby permitting an actual position to correspond with a dialed-in position.

16 Claims, 8 Drawing Sheets

ZERO BACKLASH POSITIONING DEVICE

BACKGROUND OF THE INVENTION

1. Field of the Invention

This invention relates to a positioning device having a primary motor and a slave motor functioning together to lock the positioning device into a fixed position with zero backlash.

2. Description of Related Art

Positioning devices, such as Pan & Tilt devices and those described herein, are commonly housings that support one or more components. The positioning device enables such components to move in a predetermined and/or selectable path. The positioning device according to this invention is preferably a Pan & Tilt used in connection with a component that generates thrust and/or torque, such as a rocket launcher, but may be used in connection with other devices that require both a panning and tilting motion, including thermal imaging equipment, lasers, antennas and/or any such similar device. Pan & Tilts are commonly used in connection with weapons systems and similar applications requiring precise positioning around multiple axes of rotation; monitoring systems for security, control, interaction, measurement and other applications requiring active or passive monitoring of a particular environment.

Past positioning devices have used mechanical and/or electromechanical brakes to absorb thrust and stabilize the positioning device in the event that a torque or other force is applied that would otherwise create a dynamic imbalance in the positioning device. Such brakes do not remove backlash from the positioning device but instead freeze the positioning device into a position that isolates any backlash from transmission into the table and/or platform of the positioning device.

SUMMARY OF THE INVENTION

The positioning device according to a preferred embodiment of this invention may be a Pan & Tilt for accommodating a weapon system, a measuring system, a surveillance system or any other similar component known to those having ordinary skill in the art. A weapon system, such as a rocket launcher, is particularly susceptible to backlash within the positioning device. Backlash is defined as the amount by which a tooth space of a gear exceeds a tooth thickness of a mating gear along pitch circles. As a result, there is typically slight relative motion between engaging gears caused by "looseness" between the engaging gears. Backlash thereby creates a difference between actual positional values and "dialed-in" positional values, particularly if the mounted component creates torque, thrust or similar force or if the mounted component creates any dynamic imbalance in the internal mechanicals of the positioning device.

The positioning device according to this invention includes a housing having mechanical internals and a table that is positioned outside of the housing. The table is connected with respect to the mechanical internals of the positioning device which preferably include at least one drive gear, such as a pan gear and/or a tilt gear positioned within the housing. The pan gear is connected and positioned to rotate the table and the tilt gear is connected and positioned to tilt the table. Although the positioning device is described herein as having a pan gear and a tilt gear, any single drive gear or combination of drive gears is possible.

A first worm gear is mechanically connected with respect to the drive gear. A primary motor is thereupon operatively connected to the first worm gear. Similarly, a second worm gear is mechanically connected with respect to the drive gear. The second worm gear is preferably positioned on an opposite side of the drive gear as the first worm gear. A slave motor is operatively connected to the second worm gear.

As a result of the above described arrangement, the first worm gear and the second worm gear are each engaged with the drive gear, such as a pan gear or a tilt gear. In operation, the primary motor drives the first worm gear and the slave motor drives the second worm gear. The slave motor is preferably synchronized with the primary motor in any single direction. Without such synchronization, the first worm gear and the second worm gear would bind the drive gear and prevent any motion of the drive gear.

In such a manner, the positioning device can be located in a desired pan and/or tilt position. Once such a position is obtained, it is desirable to remove any backlash from the mechanical internals of the positioning device so that the precise position is maintained during operation of the component or components on the positioning device.

According to a preferred embodiment of this invention, backlash is removed from the positioning device by reversing the slave motor relative to the preceding single direction. The slave motor is preferably reversed until a desired torque value is obtained in the gears, particularly between the second worm gear and the drive gear.

It is therefore one object of this invention to provide a positioning device that does not backlash following application of force to the positioning device.

It is another object of this invention to provide a positioning device that precisely matches and maintains an actual position with a dialed-in position.

It is yet another object of this invention to provide a positioning device having a primary motor and a slave motor that are synchronized in any single direction relative to each other.

It is still another object of this invention to provide a positioning device that includes a slave motor that is reversible to remove backlash from the mechanical internals of the positioning device.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

According to a preferred embodiment of this invention, a positioning device 10, such as a Pan & Tilt having a range of motion around a horizontal axis and a range of motion around a vertical axis, is adaptable for use in connection with any number of components. Components may include weapons systems, such as rockets and guns, surveillance systems, such as cameras, and positioning and/or guidance systems, such as lasers. FIGS. 1–13 show various features and/or preferred embodiments of the subject invention.

As best shown in FIGS. 1–6, the positioning device 10 preferably includes a housing 20 having a table 30. The housing 20 is preferably constructed of structural materials that provide maximum torsional rigidity. In addition, the housing is preferably powder-coated and corrosion and weather resistant. In particular, the housing 20 is preferably capable of withstanding wet and otherwise corrosive environments; high (+165 degrees F.) and/or low (−30 degrees F.) temperature environments; may operate in high winds (155+mph); high humidity and/or any other possible environment suitable for the positioning device 10 such as disclosed herein. The housing 20 may include one or more removable sidewalls 35 which are removably attached to the housing 20 to facilitate access and/or adjustment to the mechanical internals, described in detail below.

Figure 1:
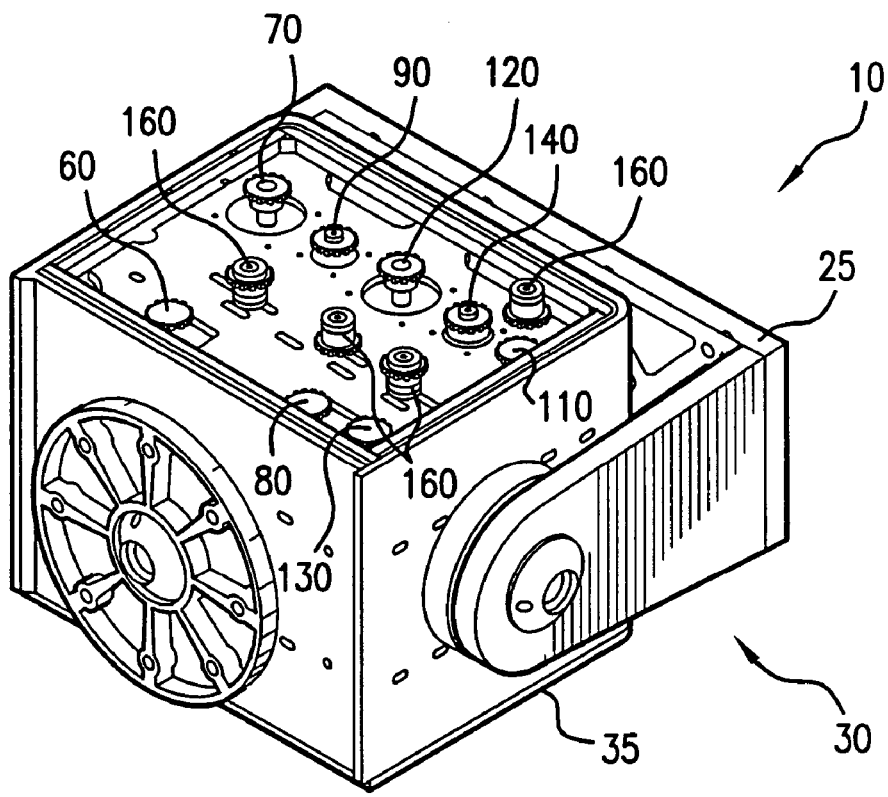
FIG. 1 is a perspective side view of a positioning device having one sidewall removed according to one preferred embodiment of this invention.
Figure 2:
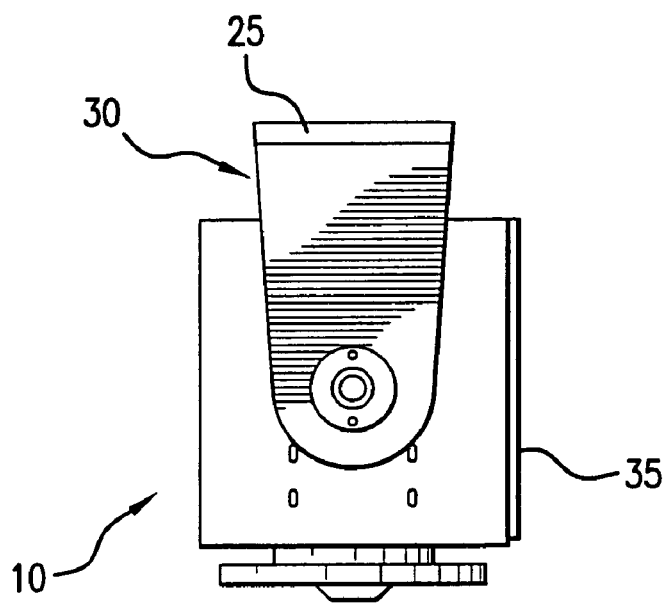
FIG. 2 is a side view of the positioning device shown in FIG. 1.
Figure 3:
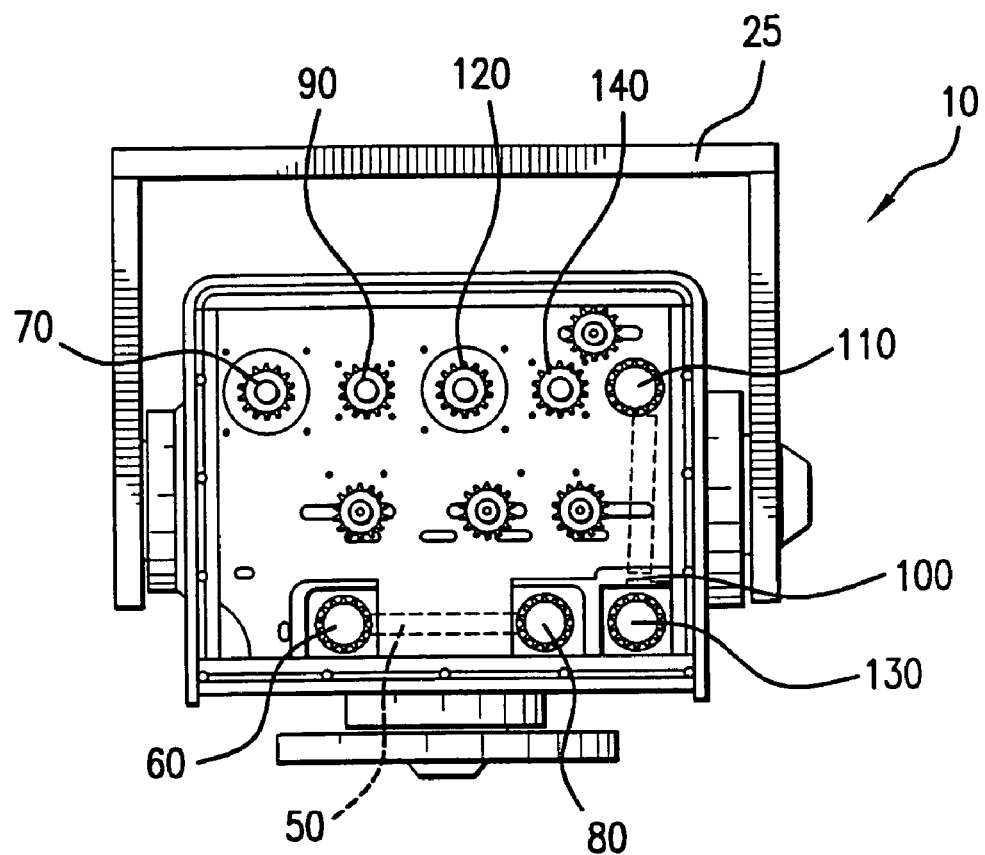
FIG. 3 is a front view of the positioning device shown in FIG. 1.
Figure 4:
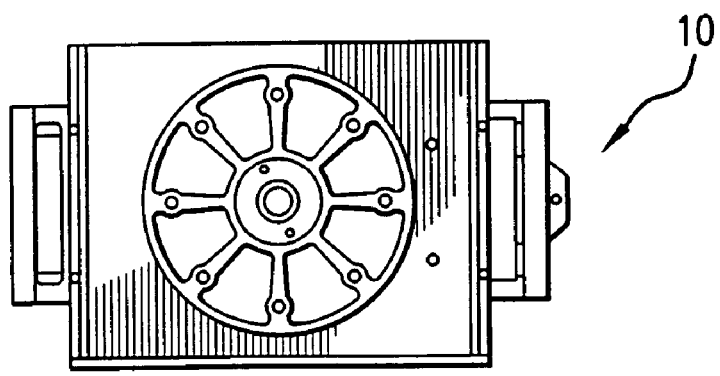
FIG. 4 is a bottom view of the positioning device shown in FIG. 1.
Figure 5:
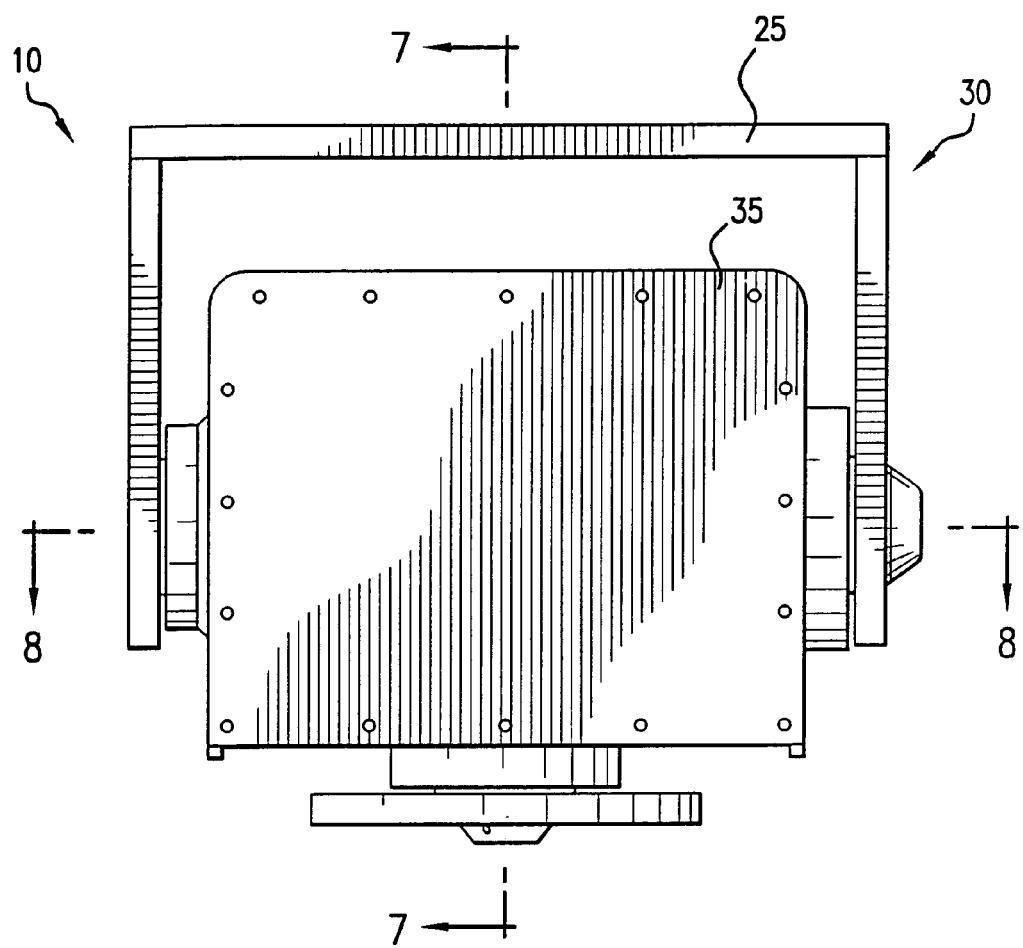
FIG. 5 is a front view of a positioning device according to one preferred embodiment of this invention.
Figure 6:
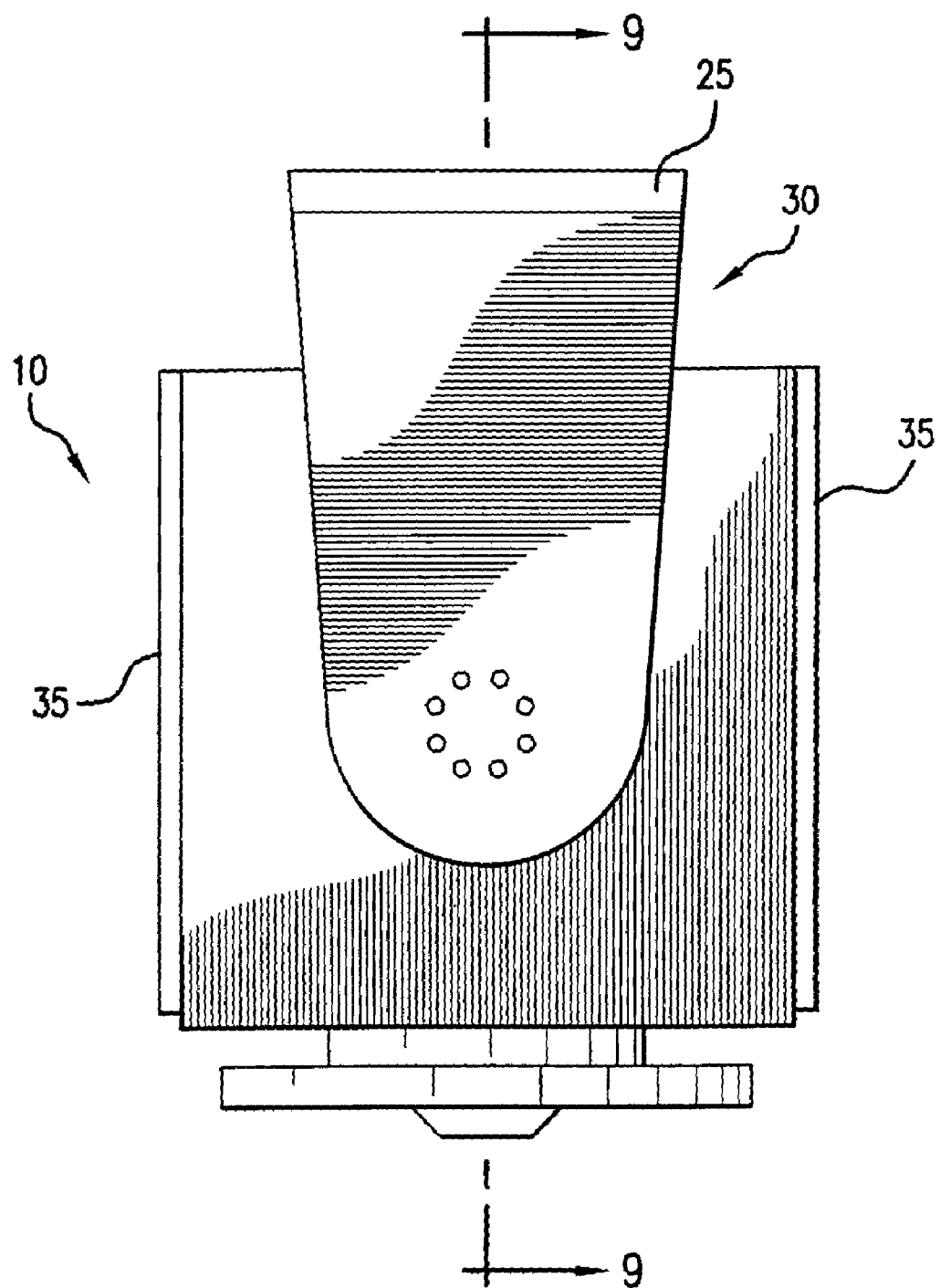
FIG. 6 is a side view of the positioning device shown in FIG. 5.
Figure 7:
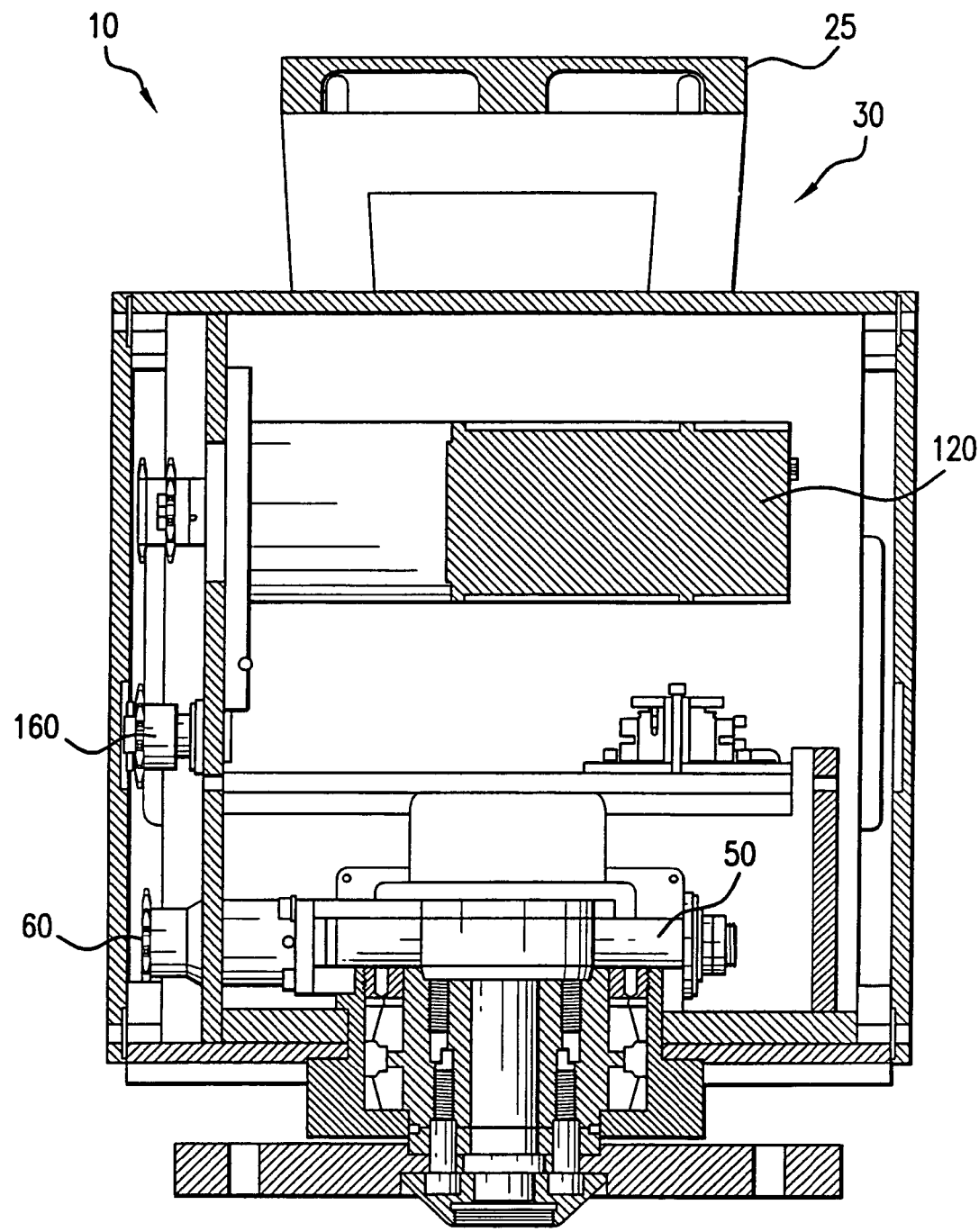
FIG. 7 is a side cross-sectional view of the positioning device shown in FIG. 5, taken along Section 7—7.
Figure 8:
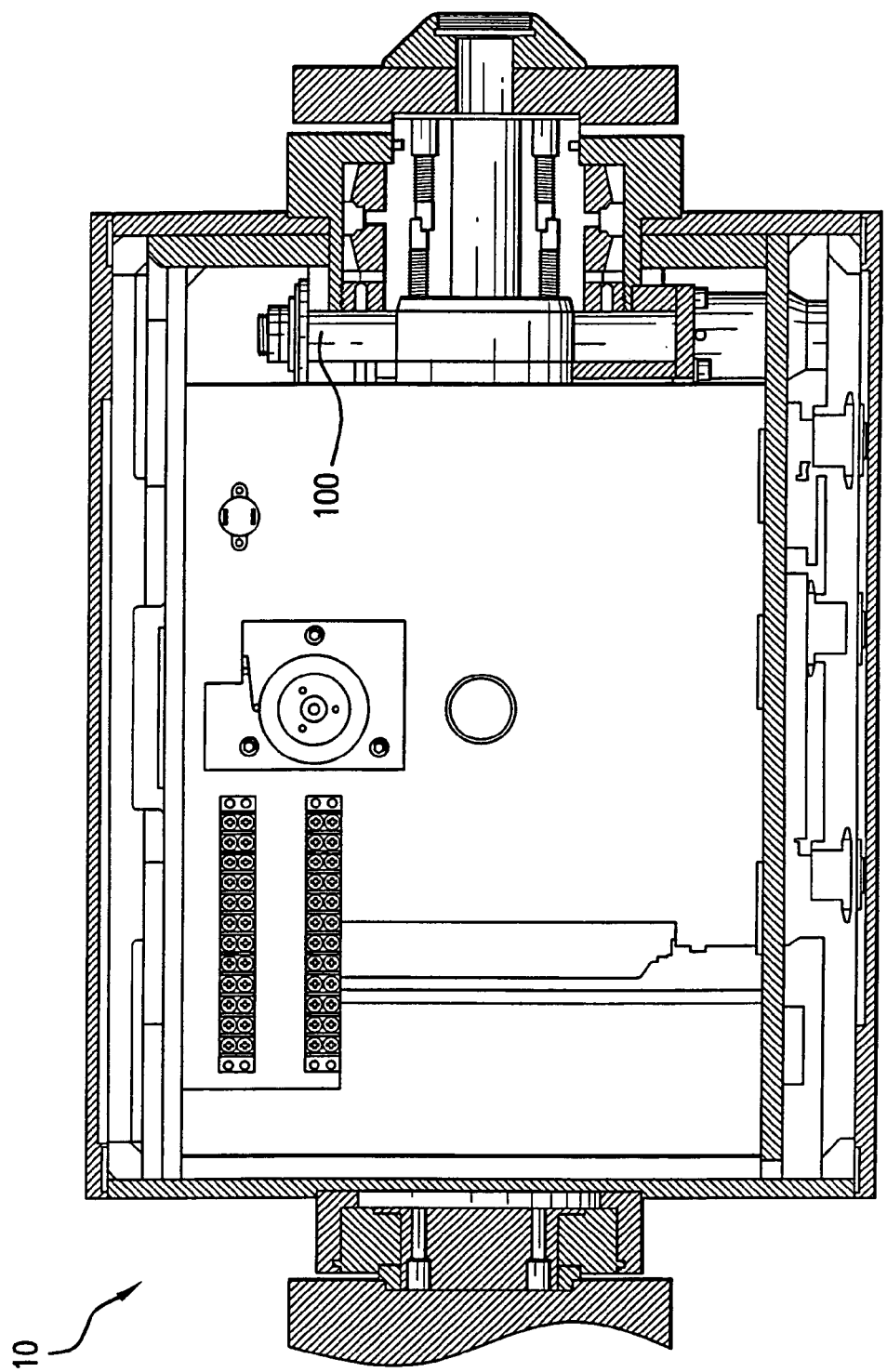
FIG. 8 is a top cross-sectional view of the positioning device shown in FIG. 5, taken along Section 8—8.

As shown in FIGS. 1–3, the table 30 is positioned outside of the housing 20 and is operatively connected to the mechanical internals of the positioning device 10. The table 30 may be a single piece, generally "U" shaped bracket connected with either side of the housing 20 or is preferably formed with two separate end pieces extending from each side of the housing 20 and connected between them with a platform 25. The platform 25 may include a groove and/or bracket for accepting a component, such as a camera and/or camera enclosure.

Figure 9:
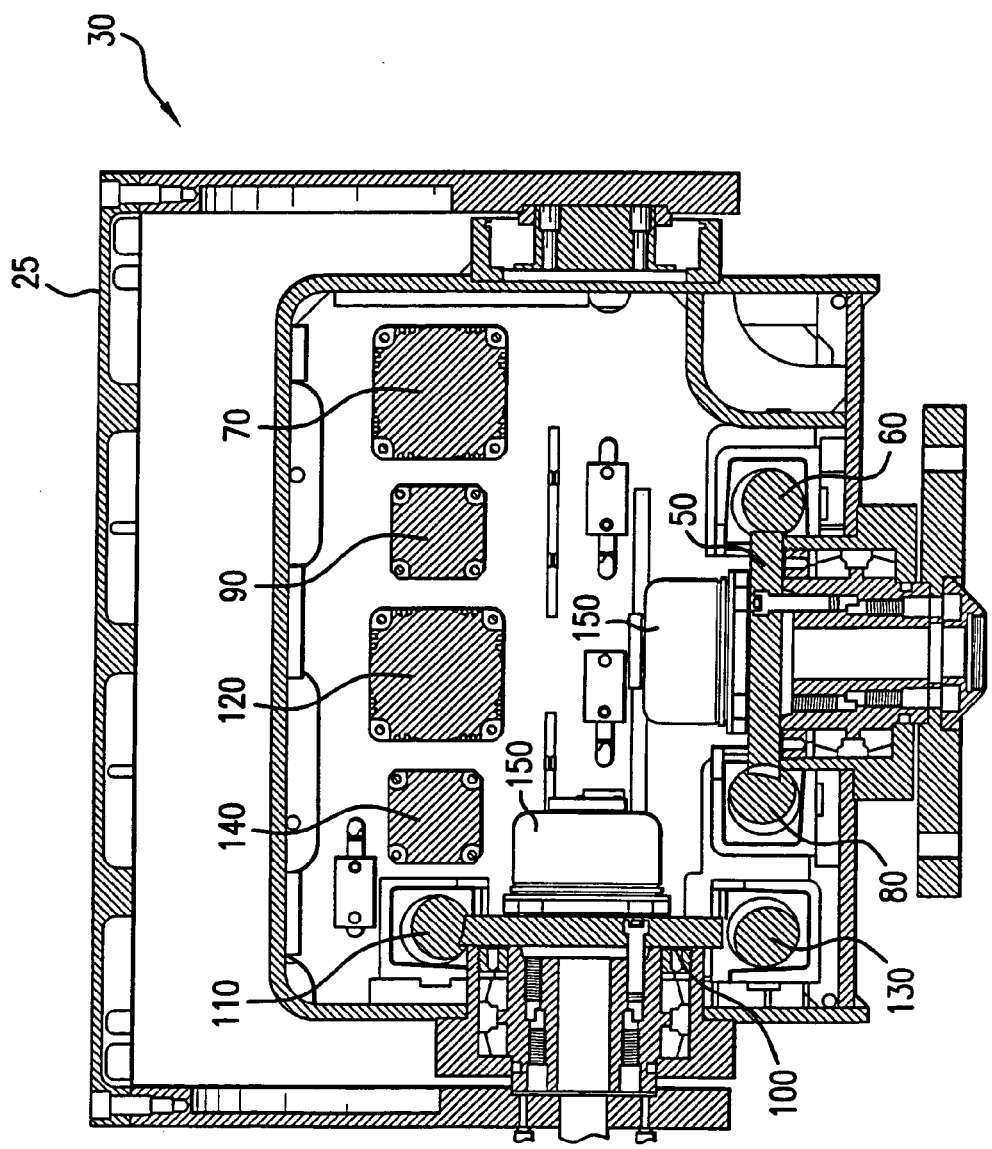
FIG. 9 is a front cross-sectional view of the positioning device shown in FIG. 6, taken along Section 9—9.
Figure 10:
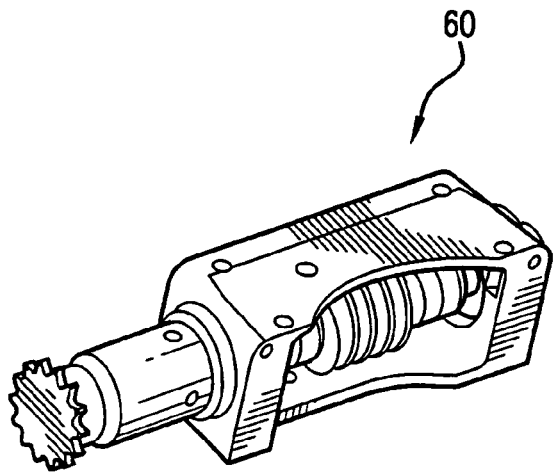
FIG. 10 is a front perspective view of a worm gear according to one preferred embodiment of this invention.
Figure 11:
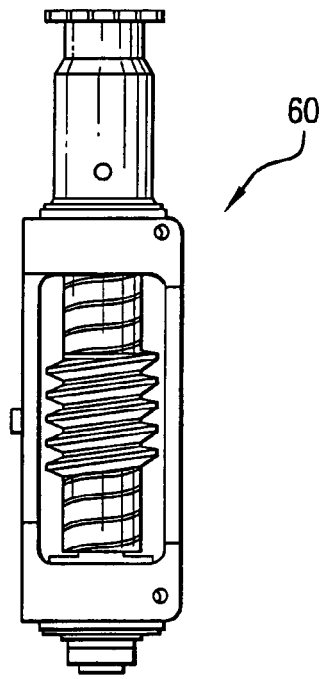
FIG. 11 is a front view of the worm gear shown in FIG. 10.

The mechanical internals of the positioning device 10 are best shown in FIGS. 3 and 9 and preferably include a pan gear 50 positioned within the housing 20. The pan gear 50 is connected and positioned to rotate the table 30. Likewise, the positioning device 10 further includes a tilt gear 100 positioned within the housing 20. The tilt gear 100 is connected and positioned to the table 30. The positioning device 10 is described herein as having a pan gear 50 and a tilt gear 100, specifically for application in a Pan & Tilt device, however, this invention is not limited to a positioning device having both a pan gear 50 and a tilt gear 100. The principles of the described invention work equally well for a positioning device 10 having only a pan gear 50, only a tilt gear 100 and/or any other gear or combination of gears requiring elimination of backlash.

As best shown in FIG. 9, a first pan worm gear 60 is mechanically connected with respect to the pan gear 50. A primary pan motor 70 is thereupon operatively connected to the first pan worm gear 60. The primary pan motor 70 is preferably connected to the first pan worm gear 60 with a chain or other mechanical linkage.

As further shown in FIG. 9, a second pan worm gear 80 is preferably mechanically connected with respect to the pan gear 50. The second pan worm gear 80 is preferably positioned on an opposite side of the pan gear 50 as the first pan worm gear 60, primarily in the interests of balancing the dynamics of the positioning device 10 and maximizing the spatial efficiency of the mechanical internals within the housing 20. A slave pan motor 90 is preferably operatively connected to the second pan worm gear 80. The slave pan motor 90 is preferably connected to the second pan worm gear 80 with a chain or other mechanical linkage.

Likewise, according to a preferred embodiment of this invention best shown in FIG. 9, a first tilt worm gear 110 is mechanically connected with respect to a tilt gear 100. A primary tilt motor 120 is operatively connected to the first tilt worm gear 110, preferably with a chain or other mechanical linkage. A second tilt worm gear 130 is mechanically connected with respect to the tilt gear 100. Preferably the second tilt worm gear 130 is positioned on an opposite side of the tilt gear 100 as the first tilt worm gear 110. A slave tilt motor 140 is operatively connected to the second tilt worm gear 130, preferably with a chain or other mechanical linkage.

According to one preferred embodiment of this invention, the first tilt worm gear 110 and the second tilt worm gear 130 are aligned in a separate plane from the first pan worm gear 60 and the second pan worm gear 80.

As best shown in FIGS. 1 and 3, the first tilt worm gear 110, the second tilt worm gear 130, the first pan worm gear 60 and the second pan worm gear 80 all have parallel longitudinal axes. In addition, the primary pan motor 70, slave pan motor 90, primary tilt motor 120 and slave tilt motor 140 all include parallel longitudinal axes. As a result, each rotating shaft within positioning device 10 is preferably aligned in the same direction, thereby resulting in sprockets and gear teeth that are all aligned along one surface inside of housing 20, such as shown in FIG. 1. Such alignment facilitates access to the motor/drive gear linkages along one surface of the positioning device 10, such as behind a removable sidewall 35.

As a result of the above described arrangement, the first pan worm gear 60 and the second pan worm gear 80 are each engaged with the pan gear 50. In operation, the primary pan motor 70 drives the first pan worm gear 60 and the slave pan motor 90 drives the second pan worm gear 80. The slave pan motor 90 is synchronized with the primary pan motor 70 in a desired direction of motion. Without such synchronization, the first pan worm gear 60 and/or the second pan worm gear 80 would bind the pan gear 50 and prevent any motion of the pan gear 50.

Likewise, the first tilt worm gear 110 and the second tilt worm gear 130 are each engaged with the tilt gear 100. In operation, the primary tilt motor 120 drives the first tilt worm gear 110 and the slave tilt motor 140 drives the second tilt worm gear 130. The slave tilt motor 140 is synchronized with the primary tilt motor 120 in any single direction. Synchronization in such arrangement prevents binding of the tilt gear 130.

An inherent property of a single drive worm gear is that it does not move without power assistance. An object of this invention is to take advantage of this property when the mechanical system is static, or at rest, to prevent backlash within the mechanical system. Therefore, the slave motor

90, 140 must be synchronized with the primary motor 70, 120 in any single direction of operation or the gearing will bind and the positioning device 10 will not move.

In such a manner, the positioning device 10, particularly the table 30 of the positioning device 10, can be located in a desired pan and/or tilt position. Once such a position is obtained, it is desirable to remove any backlash from the mechanical internals of the positioning device 10 so that the precise position is maintained during operation of the component or components on the positioning device 10. Backlash is defined as the amount by which a tooth space of a gear exceeds a tooth thickness of a mating gear along the pitch circles. As a result, there is typically slight relative motion between engaging gears caused by "looseness" between the engaging gears. Backlash thereby creates a difference between actual positional values and "dialed-in" positional values, particularly if the mounted component creates torque, thrust or similar force or if the mounted component creates any dynamic imbalance in the internal mechanicals of the positioning device 10.

Figure 12:
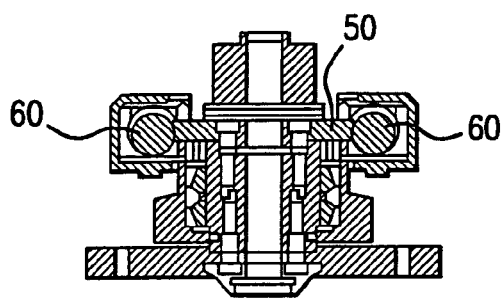
FIG. 12 is a front view of a portion of a positioning device according to one preferred embodiment of this invention.
Figure 13:
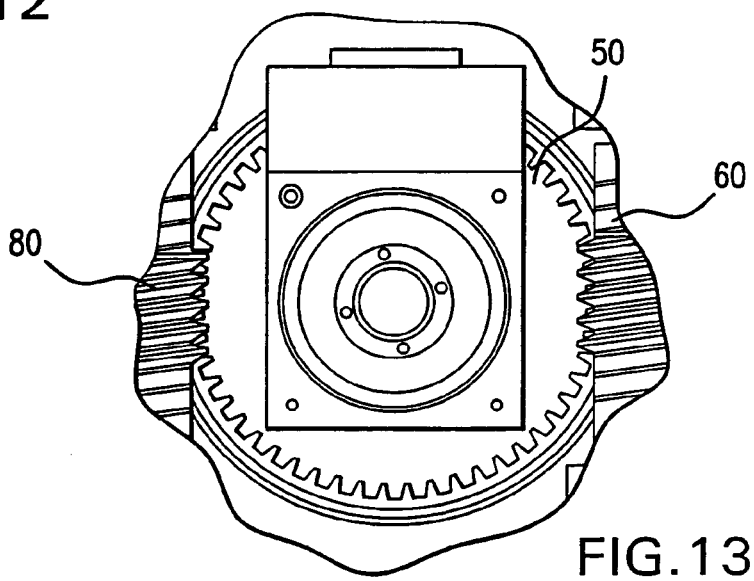
FIG. 13 is a top view of the portion of the positioning device shown in FIG. 12 showing engagement of two opposing worm gears with a drive gear.

According to a preferred embodiment of this invention, backlash is removed from the positioning device 10 by reversing a slave motor, specifically, the slave pan motor 90 and/or the slave tilt motor 140. The slave motor is preferably reversed until a desired torque value is obtained in the gears, particularly between the second pan worm gear 80 and the pan gear 50 and/or between the second tilt worm gear 130 and the tilt gear 100. FIGS. 12 and 13 show an isolated and magnified view of the engagement of first pan worm gear 60 and second pan worm gear 80 with pan gear 50. Alternatively, a torque reading can be measured from any operational gear in the positioning device to obtain a stop value for the slave motor 90, 140.

An encoder 150 is preferably operatively associated with the table 30. The encoder 150 is preferably used to determine a precise pan and/or tilt location of the table 30. The encoder 150 may be an external encoder directly mounted to a gear along an axis of motion of the positioning device 10. The encoder 150 is preferably positioned in close proximity to the table 30 to provide an accurate reporting of the physical position of the table 30. This value is the "dialed-in" value desired by the operator and, according to an object of this invention, should remain fixed following removal of backlash from the mechanical system.

Accordingly, a method for eliminating backlash in a positioning device 10 includes associating a first worm gear 60, 110 and a second worm gear 80, 130 with a drive gear 50, 100. A primary motor 70, 120 is connected to the first worm gear 60, 110 and a slave motor 90, 140 is connected to the second worm gear 80, 130. The drive gear 50, 100 is moved in a desired direction with the primary motor 70, 120 and the slave motor 90, 140 until a desired position is obtained. Finally, the slave motor 90, 140 is moved in a reverse direction relative to the desired direction to lock the positioning device 10.

As discussed above, the primary pan motor 70 and the slave pan motor 90 are preferably synchronized in any single direction, such as forward. The slave pan motor 90 is then moved in the reverse direction relative to the any single direction until a desired torque value in the pan gear 50 is obtained. Likewise, the primary tilt motor 120 and the slave tilt motor 140 are preferably synchronized in any single direction. The slave tilt motor 140 is then moved in the reverse direction relative to the any single direction until a desired torque value in the tilt gear 100 is obtained.

The slave motor 90, 140 may be reversed until a preset torque value is obtained, until a particular rotation or movement value is obtained, or until some other value is derived that indicates that backlash is removed from the mechanical internals of the positioning device 10. In operation, a current is measured from the slave motor 90, 140 which is converted to a torque value and, once a desired torque value is obtained, the slave motor 90, 140 is shut down. This desired torque value may be fairly low and may represent when the teeth of the slave motor 90, 140, drive gear 50, 100 and/or second worm gear 80, 130 are sufficiently engaged in a reverse direction to ensure removal of backlash from the mechanical system.

According to one preferred embodiment of this invention, upon start-up of the positioning device 10, the slave motor 90, 140 momentarily moves to find a center of the gearing and then proceeds to synchronize motion with the primary motor 70, 120. The slave motor 90, 140 preferably finds the center of the gearing by abutting gear teeth in a desired direction and then abutting gear teeth in a rearward direction relative to the desired direction and then positioning itself precisely between these positions. In this way, the slave motor 90, 140 uncinches the positioning device 10 from its previous position. In addition, the slave motor 90, 140 ensures that the primary motor 70, 120 does not lurch ahead of the slave motor 90, 140, thereby causing binding or hesitation in the positioning device 10. Ideally, the slave motor 90, 140 never exerts a torque on the gears in the desired direction of movement.

Although not necessary, in the system described above, the primary motor 70, 120 may be larger/higher rated than the slave motor 90, 140. This is because the primary motor 70, 120 is required to do the actual lifting and moving of the table 30 while the slave motor 90, 140 only requires enough power to keep up with the primary motor 70, 120 and to obtain the required torque value in reverse. Use of separately size motors may result in a cost savings and a space savings within positioning device 10. Alternatively, according to one preferred embodiment of this invention, both the primary motor 70, 120 and the slave motor 90, 140 may be sized the same for logistical purposes or may be configured so that each absorbs a portion of the load. Such an arrangement where each of the primary motor 70, 120 and the slave motor 90, 140 absorbs a portion of the load would require a different arrangement of mechanical internals than that described herein.

Each of the motors described herein are preferably "smart" motors that may incorporate encoders and/or send and receive positional signals as positioning device 10 is moved. Such smart motors are preferably capable of measuring the torque values discussed herein. Such smart motors enable virtually all of the electronics for the positioning device 10 to be located within the housing 20.

According to one preferred embodiment of this invention, positioning device 10 is assembled so that the mechanical internals are preloaded thereby biasing the gears away from the drive. In such a way, the relative position of the gears in a static position requires some reverse motion to eliminate backlash. As the positioning device is broken in and subject to continuous operation, the gearing will begin to "loosen." According to this invention, such looseness in the gearing will not effect the ability of the positioning device 10 to remove backlash because such removal is obtained based upon real-time values within the positioning device 10.

The positioning device 10 includes a housing 20 that preferably permits 435 degree (preferably ±217.5 degrees from center) or continuous rotation capabilities and 180 degree (preferably ±90 degrees) tilt rotation capabilities. Continuous rotation is preferably accomplished using electrical contact "slip rings." In addition, the housing 20 includes internal motors and/or gearing that permit 0 degree to 20 degree per second (variable) pan speed up to 0 degree to 100 degree per second (variable) pan speed or faster. The housing 20 will also preferably permit 0 degree to 5 degree per second (variable) tilt speed up to 0 degree to 100 degree per second (variable) tilt speed or faster. Movement of the positioning device is preferably accurate and repeatable to within up to approximately 0.10 degrees and more preferably within approximately 0.006 degrees.

The positioning device 10 preferably includes internal mechanicals that accommodate adjustable hard limit switches for limiting a fixed range of motion for the pan and/or the tilt of the positioning device 10. Such limits may be useful in particular applications requiring that the component and/or positioning device 10 be limited to a particular range of motion, i.e. because of physical restrictions of the mounting environment. For positioning devices configured with slip rings and thus a 360 degree range of motion, the trip rings and, for pan rotation, limit switches are unnecessary.

As shown in FIGS. 1 and 3, the positioning device 10 may include one or more idlers 160 for adjusting and/or maintaining the tension in the chains between the various motors and the worm gears. These idlers 160 are preferably aligned in the same surface as the drive gears for the motors 70, 90, 120, 140.

The housing 20 is preferably constructed using tamper resistant fasteners and concealed wiring and connection points. Traditionally, one or more wires must extend from the positioning device 10, including at least communication and AC or DC power. According to a preferred embodiment of this invention having an optimal mount, these wires do not extend outside of the positioning device 10 or the mounting environment.

The positioning device 10 according to a preferred embodiment of this invention may include an internal heater for operation at low temperatures. In addition, or in the alternative, the positioning device may include a fan/blower for operation in humid, wet and/or high temperature environments.

While in the foregoing specification this invention has been described in relation to certain preferred embodiments thereof, and many details have been set forth for purpose of illustration, it will be apparent to those skilled in the art that the method and apparatus according to this invention are susceptible to additional embodiments and that certain of the details described herein can be varied considerably without departing from the basic principles of the invention.

We claim:

1. A positioning device comprising:
   a housing having a table;
   a pan gear positioned within the housing for rotating the table;
   a first pan worm gear mechanically connected with respect to the pan gear;
   a primary pan motor operatively connected to the first pan worm gear;
   a second pan worm gear mechanically connected with respect to the pan gear; and
   a slave pan motor operatively connected to the second pan worm gear.

2. The positioning device of claim 1 further comprising:
   a tilt gear positioned within the housing for tilting the table;
   a first tilt worm gear mechanically connected with respect to the tilt gear;
   a primary tilt motor operatively connected to the first tilt worm gear;
   a second tilt worm gear mechanically connected with respect to the tilt gear; and
   a slave tilt motor operatively connected to the second tilt worm gear.

3. The positioning device of claim 2 wherein the first tilt worm gear and the second tilt worm gear are positioned in a separate plane from the first pan worm gear and the second pan worm gear.

4. The positioning device of claim 2 wherein the first tilt worm gear and the first pan worm gear have parallel longitudinal axes.

5. The positioning device of claim 1 wherein the slave pan motor is synchronized with the primary pan motor in a desired direction.

6. The positioning device of claim 1 wherein the slave pan motor is reversible.

7. The positioning device of claim 1 wherein the first pan worm gear directly engages the pan gear on an opposite side as the second pan worm gear.

8. The positioning device of claim 1 further comprising:
   an encoder operatively associated with the table.

9. The positioning device of claim 1 wherein the first pan worm gear and the second pan worm gear have parallel longitudinal axes.

10. The positioning device of claim 9 wherein the primary pan motor and the first pan worm gear have parallel longitudinal axes.

11. A pan and tilt device comprising:
    a first tilt worm gear mechanically connected with respect to a tilt gear;
    a primary tilt motor operatively connected to the first tilt worm gear;
    a second tilt worm gear mechanically connected with respect to the tilt gear; and
    a slave tilt motor operatively connected to the second tilt worm gear.

12. The pan and tilt device of claim 11 further comprising:
    a first pan worm gear mechanically connected with respect to a pan gear;
    a primary pan motor operatively connected to the first pan worm gear;
    a second pan worm gear mechanically connected with respect to the pan gear; and
    a slave pan motor operatively connected to the second pan worm gear.

13. The pan and tilt device of claim 12 wherein the first tilt worm gear, the second tilt worm gear, the first pan worm gear and the second pan worm gear have parallel longitudinal axes.

14. The pan and tilt device of claim 11 wherein the slave tilt motor is synchronized with the primary tilt motor in a desired direction of movement.

15. The pan and tilt device of claim 11 further comprising:
    an external encoder directly mounted to a gear along an axis of motion of the pan and tilt device.

16. A pan and tilt device comprising:
    a table;
    a gear operatively associated with the table;
    at least one worm gear connected to the gear;
    a primary motor for moving the gear in any single direction; and
    a slave motor synchronized with the primary motor in the any single direction.

* * * * *